Jan. 17, 1933.   P. C. FLECK ET AL   1,894,372
PRESSURE INDICATING VALVE
Filed March 25, 1931
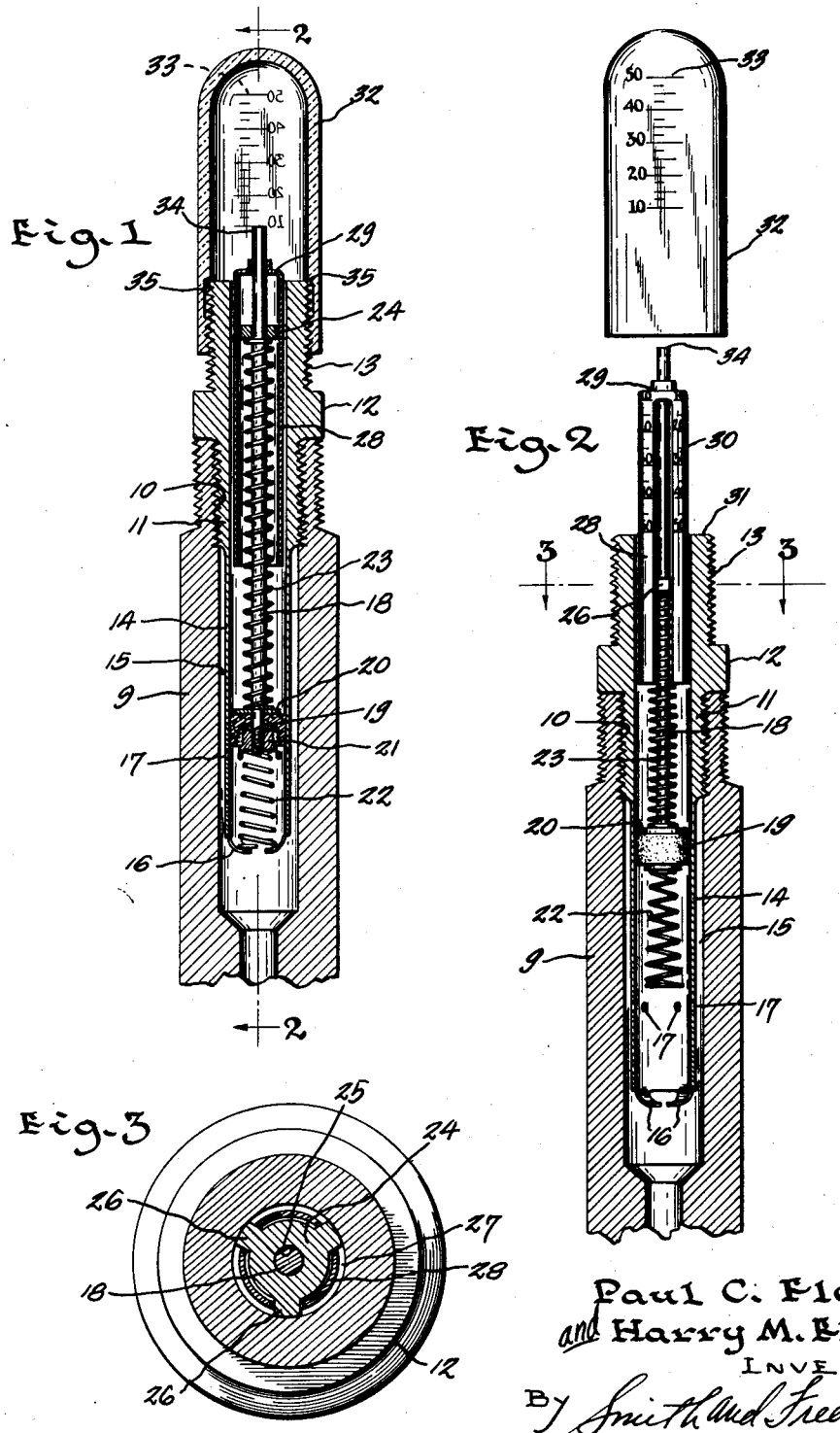
Paul C. Fleck
and Harry M. Fleck
INVENTORS
By Smith and Freeman
ATTORNEYS Patented Jan. 17, 1933

1,894,372

UNITED STATES PATENT OFFICE

PAUL C. FLECK AND HARRY M. FLECK, OF CLEVELAND, OHIO

PRESSURE INDICATING VALVE

Application filed March 25, 1931. Serial No. 525,158.

This invention relates to pressure indicating valves, more particularly adapted for use in pneumatic tires, and an object of the invention is to provide a new and improved device of this character.

In the drawing accompanying this specification and forming a part of this application we have shown for purposes of illustration, one form which our invention may assume, and in the drawing:

Figure 1 is a fragmentary vertical sectional view of an embodiment of the invention, showing the valve mechanism in position to indicate relatively low pressure.

Figure 2 is a vertical sectional view, corresponding to line 2—2 of Figure 1, showing the valve mechanism in position to indicate higher pressure, and showing the cap detached, while Figure 3 is an enlarged horizontal sectional view corresponding substantially to line 3—3 of Figure 2.

The embodiment of the invention herein disclosed comprises a pneumatic tire valve stem 9 inwardly threaded as at 10, for the reception therein of a valve construction including a sleeve 11, exteriorly threaded for engagement with the thread 10 of the stem 9, having a knurled collar 12 by means of which the sleeve 11 may be readily rotated to position, and exteriorly threaded as at 13 for a purpose described hereinafter, and the sleeve 11 is further provided with a portion 14 of reduced diameter extending in spaced relation with reference to the wall of the valve stem 9, providing an air passage 15 between the sleeve 11 and stem 9, and at its lower end has curved inturned spaced fingers 16 formed integrally therewith, and inwardly of the fingers 16 the sleeve 11 is provided with annularly arranged apertures 17 communicating with the interior of the sleeve 11 and the air passage 15.

Reciprocally mounted in the sleeve 11 is a plunger 18 provided at its inner end with an inverted cup-shaped flexible packing member 19, interposed between a washer 20 and a nut 21 threaded onto the plunger 18, and the nut 21 has one end of a spring 22 affixed thereto as by soldering, the free end of the spring 22 being adapted in one position to rest upon a seat formed by the fingers 16.

Surrounding the plunger 18 is a coiled expansion spring 23, at one end bearing upon the washer 20 and at its opposite end bearing upon a web 24, having an aperture 25 for the passage of the plunger 18 therethrough, and secured in fixed position to the sleeve 11 by radially extending arms 26, thereby providing arcuate slots 27 through which slidably extend spaced segmental portions 28 secured at their outer ends to a disk 29 fixedly secured to, and movable with, the plunger 18, the segmental portions 28 and disk 29 providing a skeleton formation movable within the sleeve 11 and which in no way impedes passage of air therepast and through the sleeve 11.

Provided along the outer surface of each segmental portion 28 is a scale 30 having graduations adapted to register with the outer extreme surface 31 of the sleeve 11 during movement of the plunger 18. If desired the indicating surface 31 and the indicia of the scale may be treated in a well known way to render the same luminous in darkness.

A cap 32 may be threaded upon the threaded portion 13 of the sleeve 11, and this cap is preferably made up of suitable transparent material, and provided with one or more scales 33 proportioned to cooperate with the end 34 of the plunger 18 so as to indicate pressures when the cap 32 is in position, a stop 35 being provided upon the interior of the cap 32 adapted to engage the upper extremity 31 of the sleeve 11 so as to insure accurate positioning of the cap 32 with reference to the plunger 18. If desired the scales 33 and the end 34 of the plunger 18 may be treated in a well known manner to render the same luminous in darkness.

An important feature of the invention resides in being able to ascertain the pressure in the tire without removing the cap 32. It will be observed that with the cap 32 in position the movement of the end 34 of the plunger 18 registers with one or more of the graduations on the scale 33, and the movement of the plunger indicates the amount of air pressure in the tire, air from the interior of the tire passing between the fingers 16 and into the sleeve 11, passing also into the passage 15, thence through the apertures 17 into the sleeve 11, and, dependent upon the degree of pressure in the tire, exerting pressure upon the packing member 19, thus urging the plunger 18 outwardly and causing the end 34 to assume various positions with reference to the scale 33.

When pressure in the tire has fallen in a manner illustrated in Figure 1, for instance, this fact may be observed without removing the cap 32; but when pressure has fallen to this extent the tire obviously must be inflated to a greater pressure. Accordingly the cap 32 is removed, disclosing the scales 30 which also indicate the pressure in the tire in a manner similar to that before referred to.

To inflate the tire, an air hose, such as that ordinarily used, may be engaged with the portion 13 of the sleeve 11, and air issuing from this hose passes into the sleeve 11, through the slots 27, between the segments 28, impinges against the packing member 19, forces the packing member 19 below the openings 17, this movement compressing the spring 22 against the seat provided by the fingers 16, the air thence passing through the openings 17 and through the passage 15 to the tire proper. When the external air pressure is released, the spring 22 forces the packing member 19 above the openings 17 which is the limit of effective upward movement of the spring 22; additionally the air within the tire exerts a pressure beneath the packing member 19, additionally forcing the packing member 19 upwardly, and also spreading the flexible walls of the packing member 19 into air tight sealing relation with the walls of the sleeve 11. When the packing member 19 has reached a position above the openings 17 the full pressure in the tire is exerted thereon, causing the plunger 18 to rise, carrying the affixed segments 28 therewith which register with the top surface 31 of the sleeve 11, outward movement of the packing member 19 being resisted by the spring 23, and the degree of outward movement of the plunger 18 is dependent upon the proportionate strength of the internal air pressure and the spring 23. During the inflation process the amount of air pressure within the tire is determined by reading any one of the scales 30 as will be understood. After the inflation process is completed the cap 32 may be replaced and does not again have to be removed until observation without removing the cap, indicates that inflation is required.

It will be perceived that the valve as hereinbefore described combines in a highly novel manner the properties of air pressure valves and air pressure gages, wherein; the air is sealed in the tire, yet the pressure therein may be determined without the use of an independent air pressure gage; also the amount of pressure within a tire is easily seen without removing the valve cap and applying an independent air pressure gage to ascertain the pressure; and additionally the amount of air pressure is visible in darkness, either with the cap 32 in place or if removed from the sleeve 11.

It will be apparent to those skilled in the art that the embodiment herein disclosed accomplishes at least the principal object of the invention, and includes uses and advantages other than those herein disclosed; it will also be understood that said embodiment may be variously changed and modified without departing from the spirit of the invention; and accordingly said embodiment is illustrative only and the invention is not limited thereto.

We claim:

A combined gage and valve device cooperable with a duct communicable with a container of gas under pressure, comprising: a sleeve secured in said duct, having a portion affixed in air tight relation with respect to said duct and having a portion spaced with respect to said duct, said spaced portion having an aperture communicating with said duct, the outer end of said sleeve being open, a piston mounted in said sleeve and subject to pressure exerted by said gas, movable to opposite sides of said aperture, in one position uncovering said aperture at the outer side of the piston, and in another position passing outwardly beyond and closing communication between said aperture and the outer end of the sleeve, and indicating mechanism in said sleeve having means resisting movement of said piston, yieldable different extents dependent upon fluctuations in pressure, and having means operable to visually indicate said fluctuations.

In testimony whereof, we hereunto affix our signatures.

PAUL C. FLECK.
HARRY M. FLECK.